July 16, 1957                  G. LANGE                  2,799,207
GAUSS TYPE PHOTOGRAPHIC OBJECTIVE CONTAINING TWO OUTER
COLLECTIVE AND TWO INNER DISPERSIVE MEMBERS
Filed July 29, 1955
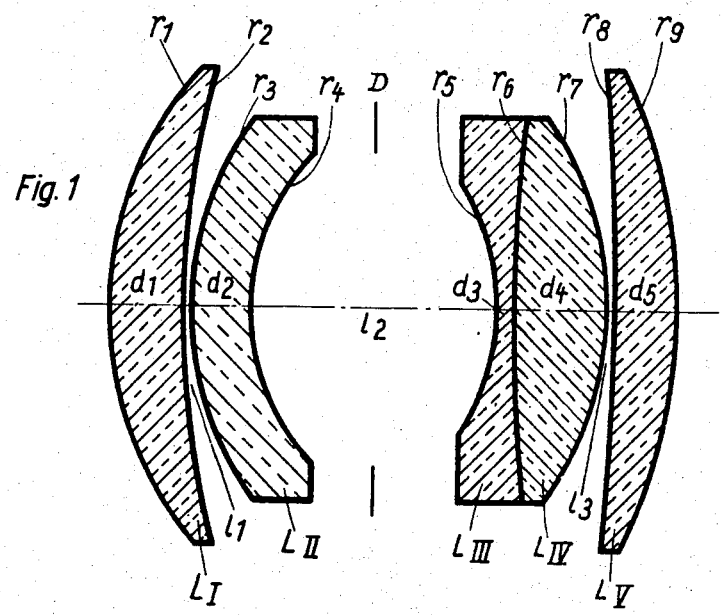
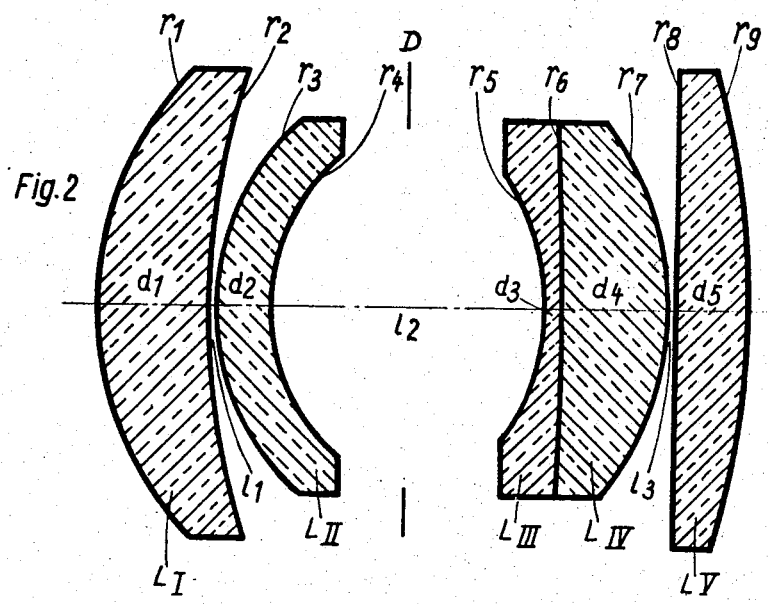

2,799,207
GAUSS TYPE PHOTOGRAPHIC OBJECTIVE CONTAINING TWO OUTER COLLECTIVE AND TWO INNER DISPERSIVE MEMBERS

Günther Lange, Konigsbronn, Germany, assignor to Carl Zeiss of Heidenheim a. d. Brenz, Wurttemberg, Germany Application July 29, 1955, Serial No. 525,333

Claims priority, application Germany August 2, 1954

11 Claims. (Cl. 88—57)

The invention concerns photographic objectives which contain at least four members of which at least two are collective and at least two are dispersive, the latter including the diaphragm between them and in which the two surfaces having the strongest collective power and bordering on air are arranged on opposite sides of the diaphragm and turn their concave surfaces towards it. Objectives of this kind are called Gauss objectives. The invention can also be applied to objectives with more than four members in which, however, the basic construction of these so-called Gauss objectives is adhered to, i. e. that at least one collective and one dispersive member each is arranged on either side of the diaphragm, the dispersive member on each side being arranged towards the diaphragm.

The investigations forming the basis of this invention have shown that in objectives with relative apertures greater than 1:4.5 and with an angular field larger than $\pm 14°$ a good compromise can be obtained between the aberrations determining the image quality, if the following conditions are simultaneously fulfilled:

$$0.10 \cdot f < r_v < 0.40 \cdot f$$
$$0.10 \cdot f < |r_h| < 0.40 \cdot f$$
$$1.0 \cdot \bar{r}_s < D_s < 2.0 \cdot \bar{r}_s$$
$$0.3 \cdot f < D_s < 0.55 \cdot f$$
$$0.20 \cdot f < \bar{r}_s < 0.40 \cdot f$$
$$1.40 \cdot \bar{r}_z < D_s < 2.80 \cdot \bar{r}_z$$
$$0.80 \cdot \bar{r}_z < D_z < 1.60 \cdot \bar{r}_z$$
$$0.20 \cdot f < D_z < 0.40 \cdot f$$
$$0.15 \cdot f < \bar{r}_z < 0.30 \cdot f$$
$$d_{II} < 0.10 \cdot f$$
$$d_{II} < 0.90 \cdot d_{III}$$
$$0.10 \cdot f < d_{II} + d_{III} < 0.25 \cdot f$$

wherein the symbols used have the following meaning:

$f$ = the focal length of the objective
$r_v$ = the radius of the concave surface standing immediately in front of the diaphragm
$r_h$ = the radius of the concave surface standing immediately behind the diaphragm
$D_s$ = the apical distance between the two surfaces showing the strongest collective power
$\bar{r}_s$ = the arithmetical mean of the absolute values of the radii of these two surfaces showing the strongest collective power
$D_z$ = the apical distance between the two dispersive concave surfaces next to the diaphragm
$\bar{r}_z$ = the arithmetical mean of the absolute values of the radii of these two dispersive concave surfaces next to the diaphragm.

$d_{II}$ = the apical distance between the surface with the strongest collective power in front of the diaphragm and the dispersive concave surface standing immediately in front of the diaphragm (in the embodiments therefore $d_{II}$ = the thickness of the second member).

$d_{III}$ = the apical distance between the concave dispersive surface standing immediately behind the diaphragm and the surface with the strongest collective power behind the diaphragm (in the embodiment therefore $d_{III}$ = the thickness of the third member).

With a view to correction of the coma it is an advantage in the objectives according to the invention to select the curvatures of the external surfaces of the entire objective in such a way that the following conditions are additionally satisfied:

$$0.30 \cdot f < \frac{2r_1 \cdot |r_k|}{r_1 + |r_k|} < 0.50 \cdot f$$

$$0.80 \cdot D_s < \frac{2r_1 \cdot |r_k|}{r_1 + |r_k|} < 1.30 \cdot D_s$$

$$0.70 \cdot |r_h| < r_v < 1.20 \cdot |r_h|$$

wherein these further symbols have the following meaning:

$r_1$ = the radius of the first surface
$r_k$ = the radius of the last surface of the objective.

If the objectives according to the invention are to contain four members only, it is advisable with a view to good chromatic correction to combine the dispersive member following the diaphragm from two lenses of opposed refractive powers cemented to each other, wherein the negative lens consists of a glass of higher dispersion than the positive lens cemented to it.

In the interest of a good field flattening effect the negative lens of the cemented member following the diaphragm is arranged nearest the diaphragm, according to a further point of this invention, and is made from a glass of higher refractive index than the positive lens cemented to it.

For the same purpose it is further proposed to give negative refractive power to the surface which immediately precedes the surface having the strongest collective power on the object side, and to select its radius within the limits of $0.50 \cdot f$ and $1.50 \cdot f$.

For the chromatic correction of oblique beams it is advisable to select for the last lens of the entire objective a glass of high dispersion with a v-value less than 35.

In the following illustrations five embodiments of objectives according to the present invention are shown, with numerical values for these embodiments given in the attached tables. The embodiments I to IV correspond to Fig. 1, the embodiment V to Fig. 2.

In these figures and embodiments the symbols designate

With L the lenses
With r the radii
With d the thicknesses
With l the air space between the individual members, and
With D the diaphragm.

The values refer to a focal length $f=1$. The embodiments I and II have an aperture ratio 1:2.8, while the embodiments III, IV and V show an aperture ratio 1:3.5.

Embodiment I

[Focal intercept $s'=0.7361$. Angular field $\pm 28°$.]

| Lenses | Radii | Thicknesses and Separations | $n_d$ | $v$ |
|---|---|---|---|---|
| $L_I$ | $r_1=+0.347219$ | $d_1=0.07573$ | 1.62041 | 60.3 |
|  | $r_2=+0.904131$ | $l_1=0.00132$ |  |  |
| $L_{II}$ | $r_3=+0.309462$ | $d_2=0.06236$ | 1.75520 | 27.5 |
|  | $r_4=+0.215955$ | $l_2=0.24492$ |  |  |
| $L_{III}$ | $r_5=-0.228743$ | $d_3=0.01324$ | 1.71736 | 29.5 |
|  | $r_6=+1.69089$ |  |  |  |
| $L_{IV}$ |  | $d_4=0.09492$ | 1.69067 | 54.9 |
|  | $r_7=-0.320794$ | $l_3=0.00132$ |  |  |
|  | $r_8=-2.83857$ |  |  |  |
| $L_V$ |  | $d_5=0.06620$ | 1.75520 | 27.5 |
|  | $r_9=-0.538549$ |  |  |  |

Embodiment II

[Focal intercept $s'=0.7381$. Angular field $\pm 26°$.]

| Lenses | Radii | Thicknesses and Separations | $n_d$ | $v$ |
|---|---|---|---|---|
| $L_I$ | $r_1=+0.340573$ | $d_1=0.07611$ | 1.62041 | 60.3 |
|  | $r_2=+0.855458$ | $l_1=0.00070$ |  |  |
| $L_{II}$ | $r_3=+0.312399$ | $d_2=0.06211$ | 1.74000 | 28.2 |
|  | $r_4=+0.216436$ | $l_2=0.25278$ |  |  |
| $L_{III}$ | $r_5=-0.219576$ | $d_3=0.01359$ | 1.71736 | 29.5 |
|  | $r_6=+2.51745$ |  |  |  |
| $L_{IV}$ |  | $d_4=0.09513$ | 1.69067 | 54.9 |
|  | $r_7=-0.303531$ | $l_3=0.00070$ |  |  |
|  | $r_8=-3.21519$ |  |  |  |
| $L_V$ |  | $d_5=0.06218$ | 1.74000 | 28.2 |
|  | $r_9=-0.551546$ |  |  |  |

Embodiment III

[Focal intercept $s'=0.7342$. Angular field $\pm 32°$.]

| Lenses | Radii | Thicknesses and Separations | $n_d$ | $v$ |
|---|---|---|---|---|
| $L_I$ | $r_1=+0.346433$ | $d_1=0.10479$ | 1.62041 | 60.3 |
|  | $r_2=+0.857784$ | $l_1=0.00283$ |  |  |
| $L_{II}$ | $r_3=+0.300014$ | $d_2=0.05098$ | 1.76182 | 26.5 |
|  | $r_4=+0.215461$ | $l_2=0.23224$ |  |  |
| $L_{III}$ | $r_5=-0.218585$ | $d_3=0.01643$ | 1.71736 | 29.5 |
|  | $r_6=+1.94815$ |  |  |  |
| $L_{IV}$ |  | $d_4=0.09063$ | 1.69067 | 55.2 |
|  | $r_7=-0.313240$ | $l_3=0.00283$ |  |  |
|  | $r_8=-3.00014$ |  |  |  |
| $L_V$ |  | $d_5=0.06231$ | 1.75520 | 27.5 |
|  | $r_9=-0.525852$ |  |  |  |

Embodiment IV

[Focal intercept $s'=0.7520$. Angular field $\pm 28°$.]

| Lenses | Radii | Thicknesses and Separations | $n_d$ | $v$ |
|---|---|---|---|---|
| $L_I$ | $r_1=+0.316198$ | $d_1=0.06440$ | 1.62041 | 60.3 |
|  | $r_2=+0.796017$ | $l_1=0.00075$ |  |  |
| $L_{II}$ | $r_3=+0.310118$ | $d_2=0.06012$ | 1.74000 | 28.2 |
|  | $r_4=+0.214856$ | $l_2=0.21416$ |  |  |
| $L_{III}$ | $r_5=-0.217975$ | $d_3=0.01127$ | 1.75520 | 27.5 |
|  | $r_6=+4.22574$ |  |  |  |
| $L_{IV}$ |  | $d_4=0.07327$ | 1.74400 | 44.7 |
|  | $r_7=-0.305685$ | $l_3=0.00075$ |  |  |
|  | $r_8=-2.02840$ |  |  |  |
| $L_V$ |  | $d_5=0.04884$ | 1.75520 | 27.5 |
|  | $r_9=-0.502228$ |  |  |  |

Embodiment V

[Focal intercept $s'=0.7162$. Angular field $\pm 32°$.]

| Lenses | Radii | Thicknesses and Separations | $n_d$ | $v$ |
|---|---|---|---|---|
| $L_I$ | $r_1=+0.333059$ | $d_1=0.11008$ | 1.62041 | 60.3 |
|  | $r_2=+0.740267$ | $l_1=0.00282$ |  |  |
| $L_{II}$ | $r_3=+0.247966$ | $d_2=0.03528$ | 1.75520 | 27.5 |
|  | $r_4=+0.188642$ | $l_2=0.27096$ |  |  |
| $L_{III}$ | $r_5=-0.230748$ | $d_3=0.01694$ | 1.72825 | 28.3 |
|  | $r_6=-2.66465$ |  |  |  |
| $L_{IV}$ |  | $d_4=0.10641$ | 1.69067 | 55.2 |
|  | $r_7=-0.290496$ | $l_3=0.00282$ |  |  |
|  | $r_8=\infty$ |  |  |  |
| $L_V$ |  | $d_5=0.07056$ | 1.72825 | 28.3 |
|  | $r_9=-0.812863$ |  |  |  |

I claim:

1. A photographic objective containing at least four members, of which at least two are collective and two are dispersive, in which the latter include the diaphragm within them and turn their concave surfaces towards it and in which the two surfaces having the strongest collective power and bordering on air are arranged on opposite sides of the diaphragm and turn their concave sides towards it, and characterized in that the following conditions are simultaneously fulfilled:

$$0.10 \cdot f < r_v < 0.40 \cdot f$$
$$0.10 \cdot f < r_h < 0.40 \cdot f$$
$$1.0 \cdot \bar{r}_s < D_s < 2.0 \cdot \bar{r}_s$$
$$0.3 \cdot f < D_s < 0.55 \cdot f$$
$$0.20 \cdot f < \bar{r}_s < 0.40 \cdot f$$
$$1.40 \cdot \bar{r}_z < D_s < 2.80 \cdot \bar{r}_z$$
$$0.80 \cdot \bar{r}_z < D_z < 1.60 \cdot \bar{r}_z$$
$$0.20 \cdot f < D_z < 0.40 \cdot f$$
$$0.15 \cdot f < \bar{r}_z < 0.30 \cdot f$$
$$d_{II} < 0.10 \cdot f$$
$$d_{II} < 0.90 \cdot d_{III}$$
$$0.10 \cdot f < d_{II} + d_{III} < 0.25 \cdot f$$

and in which the symbols used have the following meaning:

$f$ = the focal length of the objective $r_v$ = the radius of the dispersive concave surface standing immediately in front of the diaphragm $r_h$ = the radius of the dispersive concave surface standing immediately behind the diaphragm $D_s$ = the apical distance between the two surfaces showing the strongest collective power $r_s$ = the arithmetical mean of the absolute values of the radii of these two surfaces showing the strongest collective power $D_z$ = the apical distance between the two dispersive concave surfaces next to the diaphragm $r_z$ = the arithmetical mean of the absolute values of the radii of these two dispersive concave surfaces next to the diaphragm $d_{II}$ = the apical distance between the surface with the strongest collective power in front of the diaphragm and the dispersive concave surface standing immediately in front of the diaphragm (in the embodiments therefore $d_{II}$ = the thickness of the second member).

$d_{III}$ = the apical distance between the concave dispersive surface immediately behind the diaphragm and the surface with the strongest collective power standing behind the diaphragm (in the embodiment therefore $d_{III}$ = the thickness of the third member).

2. A photographic objective according to claim 1, characterized in that the following conditions are additionally satisfied:

$$0.30 \cdot f < \frac{2r_1 \cdot |r_k|}{r_1 + |r_k|} < 0.50 \cdot f$$

$$0.80 \cdot D_e < \frac{2r_1 \cdot |r_k|}{r_1 + |r_k|} < 1.30 \cdot D_e$$

$$0.70 \cdot |r_k| < r_e < 1.20 \cdot |r_k|$$

wherein these further symbols have the following meaning:
$r_1$ = the radius of the first surface
$r_k$ = the radius of the last surface of the objective.

3. A photographic objective according to claim 1 consisting of four members, characterized in that the dispersive member following the diaphragm is combined from two lenses of opposed refractive powers cemented to each other, wherein the negative lens consists of a glass of higher dispersion than the positive lens cemented to it.

4. A photographic objective according to claim 1 characterized in that the negative lens in the cemented member following the diaphragm is arranged nearest the diaphragm and consists of a glass of higher refractive index than the positive lens cemented to it.

5. A photographic objective according to claim 1 characterized in that the surface which immediately precedes the surface having the strongest collective power on the object side, has negative refractive power, and that its radius lies between the limits of $0.50 \cdot f$ and $1.50 \cdot f$.

6. A photographic objective according to claim 1 characterized in that the v-values of the glass of the last lens is smaller than 35.

7. A photographic objective according to claim 1 characterized in that the individual refractive powers of the surfaces ($\Delta n/r$) differ by a maximum of $\pm 0.5/f$ and the lens thicknesses ($d$) and the air spaces ($l$) differ by a maximum of $\pm 0.05 \cdot f$ from the values that can be taken from the following numerical example:

| Lenses | Radii | Thicknesses and Separations | $n_d$ | $v$ | $\Delta n/r$ |
|---|---|---|---|---|---|
| $L_I$ | $r_1 = +0.347219 \cdot f$ | $d_1 = 0.07573$ | 1.62041 | 60.3 | $+1.786797/f$ |
|  | $r_2 = +0.904131 \cdot f$ |  |  |  | $-0.686194/f$ |
|  |  | $l_1 = 0.00132$ |  |  |  |
| $L_{II}$ | $r_3 = +0.309462 \cdot f$ | $d_2 = 0.06236$ | 1.75520 | 27.5 | $+2.440364/f$ |
|  | $r_4 = +0.215955 \cdot f$ |  |  |  | $-3.497024/f$ |
|  |  | $l_2 = 0.24492$ |  |  |  |
|  | $r_5 = -0.228743 \cdot f$ |  |  |  | $-3.136095/f$ |
| $L_{III}$ |  | $d_3 = 0.01324$ | 1.71736 | 29.5 |  |
| $L_{IV}$ | $r_6 = +1.69089 \cdot f$ | $d_4 = 0.09492$ | 1.69067 | 54.9 | $-0.015785/f$ |
|  | $r_7 = -0.320794 \cdot f$ |  |  |  | $+2.153001/f$ |
|  |  | $l_3 = 0.00132$ |  |  |  |
|  | $r_8 = -2.83857 \cdot f$ |  |  |  | $-0.266049/f$ |
| $L_V$ |  | $d_5 = 0.06620$ | 1.75520 | 27.5 |  |
|  | $r_9 = -0.538549 \cdot f$ |  |  |  | $+1.402286/f$ | wherein $L_I \ldots L_V$ are the lenses
$r_1 \ldots r_9$ are the radii
$d_1 \ldots d_5$ are the lens thicknesses
$l_1 \ldots l_3$ are the air spaces
$n_d$ are the indices of refraction
$v$ are the Abbe numbers and
$f$ is the focal length of the objective.

8. A photographic objective according to claim 1 characterized in that the individual refractive powers of the surfaces ($\Delta n/r$) differ by a maximum of $\pm 0.5/f$ and the lens thicknesses ($d$) and the air spaces ($l$) differ by a maximum of $\pm 0.05 \cdot f$ from the values that can be taken from the following numerical example:

| Lenses | Radii | Thicknesses and Separations | $n_d$ | $v$ | $\Delta n/r$ |
|---|---|---|---|---|---|
| $L_I$ | $r_1 = +0.340573 \cdot f$ | $d_1 = 0.07611$ | 1.62041 | 60.3 | $+1.821665/f$ |
|  | $r_2 = +0.855458 \cdot f$ |  |  |  | $-0.725237/f$ |
|  |  | $l_1 = 0.00070$ |  |  |  |
|  | $r_3 = +0.312399 \cdot f$ |  |  |  | $+2.368765/f$ |
| $L_{II}$ |  | $d_2 = 0.06211$ | 1.74000 | 28.2 |  |
|  | $r_4 = +0.216436 \cdot f$ |  |  |  | $-3.419024/f$ |
|  |  | $l_2 = 0.25278$ |  |  |  |
|  | $r_5 = -0.219576 \cdot f$ |  |  |  | $-3.267023/f$ |
| $L_{III}$ |  | $d_3 = 0.01359$ | 1.71736 | 29.5 |  |
| $L_{IV}$ | $r_6 = +2.51745 \cdot f$ |  |  |  | $-0.010602/f$ |
|  |  | $d_4 = 0.09513$ | 1.69067 | 54.9 |  |
|  | $r_7 = -0.303531 \cdot f$ |  |  |  | $+2.275451/f$ |
|  |  | $l_3 = 0.00070$ |  |  |  |
|  | $r_8 = -3.21519 \cdot f$ |  |  |  | $-0.230157/f$ |
| $L_V$ |  | $d_5 = 0.06218$ | 1.74000 | 28.2 |  |
|  | $r_9 = -0.551546 \cdot f$ |  |  |  | $+1.341683/f$ | wherein $L_I \ldots L_V$ are the lenses
$r_1 \ldots r_9$ are the radii
$d_1 \ldots d_5$ are the lens thicknesses
$l_1 \ldots l_3$ are the air spaces
$n_d$ are the indices of refraction
$v$ are the Abbe numbers and
$f$ is the focal length of the objective.

9. A photographic objective according to claim 1 characterized in that the individual refractive powers of the surfaces ($\Delta n/r$) differ by a maximum of $\pm 0.5/f$ and the lens thicknesses ($d$) and the air spaces ($l$) differ by a maximum of $\pm 0.05 \cdot f$ from the values that can be taken from the following numerical example:

| Lenses | Radii | Thicknesses and Separations | $n_d$ | $v$ | $\Delta n/r$ |
|---|---|---|---|---|---|
| $L_I$ | $r_1 = +0.346433 \cdot f$ | $d_1 = 0.10479$ | 1.62041 | 60.3 | $+1.790851/f$ |
|  | $r_2 = +0.857784 \cdot f$ |  |  |  | $-0.723270/f$ |
|  |  | $l_1 = 0.00283$ |  |  |  |
|  | $r_3 = +0.300014 \cdot f$ |  |  |  | $+2.539281/f$ |
| $L_{II}$ |  | $d_2 = 0.05098$ | 1.76182 | 26.5 |  |
|  | $r_4 = +0.215461 \cdot f$ |  |  |  | $-0.353577/f$ |
|  |  | $l_2 = 0.23224$ |  |  |  |
|  | $r_5 = -0.218585 \cdot f$ |  |  |  | $-3.281835/f$ |
| $L_{III}$ |  | $d_3 = 0.01643$ | 1.71736 | 29.5 |  |
| $L_{IV}$ | $r_6 = +1.94815 \cdot f$ |  |  |  | $-0.013700/f$ |
|  |  | $d_4 = 0.09063$ | 1.69067 | 55.2 |  |
|  | $r_7 = -0.313240 \cdot f$ |  |  |  | $+2.204922/f$ |
|  |  | $l_3 = 0.00283$ |  |  |  |
|  | $r_8 = -3.00014 \cdot f$ |  |  |  | $-0.251722/f$ |
| $L_V$ |  | $d_5 = 0.06231$ | 1.75520 | 27.5 |  |
|  | $r_9 = -0.525852 \cdot f$ |  |  |  | $+1.436145/f$ | wherein $L_I \ldots L_V$ are the lenses
$r_1 \ldots r_9$ are the radii
$d_1 \ldots d_5$ are the lens thicknesses
$l_1 \ldots l_3$ are the air spaces
$n_d$ are the indices of refraction
$v$ are the Abbe numbers and
$f$ is the focal length of the objective.

10. A photographic objective according to claim 1 characterized in that the individual refractive powers of the surfaces ($\Delta n/r$) differ by a maximum of $\pm 0.5/f$ and the lens thicknesses ($d$) and the air spaces ($l$) differ by a maximum of $\pm 0.05 \cdot f$ from the values that can be taken from the following numerical example:

| Lenses | Radii | Thicknesses and Separations | $n_d$ | $v$ | $\Delta n/r$ |
|---|---|---|---|---|---|
| $L_I$ | $r_1=+0.316198 \cdot f$ | $d_1=0.06440$ | 1.62041 | 60.3 | $+1.962093/f$ |
|  | $r_2=+0.796017 \cdot f$ | $l_1=0.00075$ |  |  | $-0.779392/f$ |
| $L_{II}$ | $r_3=+0.310118 \cdot f$ | $d_2=0.06012$ | 1.74000 | 28.2 | $+2.386188/f$ |
|  | $r_4=+0.214856 \cdot f$ | $l_2=0.21416$ |  |  | $-3.444167/f$ |
| $L_{III}$ | $r_5=-0.217975 \cdot f$ | $d_3=0.01127$ | 1.75520 | 27.5 | $-3.464617/f$ |
| $L_{IV}$ | $r_6=+4.22574 \cdot f$ | $d_4=0.07327$ | 1.74400 | 44.7 | $-0.002650/f$ |
|  | $r_7=-0.305685 \cdot f$ | $l_3=0.00075$ |  |  | $+2.433878/f$ |
| $L_V$ | $r_8=-2.02840 \cdot f$ | $d_5=0.04884$ | 1.75520 | 27.5 | $-0.372313/f$ |
|  | $r_9=-0.502228 \cdot f$ |  |  |  | $+1.503699/f$ | wherein $L_I \ldots L_V$ are the lenses
  $r_1 \ldots r_9$ are the radii
  $d_1 \ldots d_5$ are the lens thicknesses
  $l_1 \ldots l_3$ are the air spaces
  $n_d$ are the indices of refraction
  $v$ are the Abbe numbers and
  $f$ is the focal length of the objective.

11. A photographic objective according to claim 1 characterized in that the individual refractive powers of the surfaces ($\Delta n/r$) differ by a maximum of $\pm 0.5/f$ and the lens thicknesses ($d$) and the air spaces ($l$) differ by a maximum of $\pm 0.05 \cdot f$ from the values that can be taken from the following numerical example:

| Lenses | Radii | Thicknesses and Separations | $n_d$ | $v$ | $\Delta n/r$ |
|---|---|---|---|---|---|
| $L_I$ | $r_1=+0.333059 \cdot f$ | $d_1=0.11008$ | 1.62041 | 60.3 | $+1.862763/f$ |
|  | $r_2=+0.740267 \cdot f$ | $l_1=0.00282$ |  |  | $-0.838089/f$ |
| $L_{II}$ | $r_3=+0.247966 \cdot f$ | $d_2=0.03528$ | 1.75520 | 27.5 | $+3.045578/f$ |
|  | $r_4=+0.188642 \cdot f$ | $l_2=0.27096$ |  |  | $-4.003350/f$ |
| $L_{III}$ | $r_5=-0.230748 \cdot f$ | $d_3=0.01694$ | 1.72825 | 28.3 | $-3.156040/f$ |
| $L_{IV}$ | $r_6=-2.66465 \cdot f$ | $d_4=0.10641$ | 1.69067 | 55.2 | $+0.014103/f$ |
|  | $r_7=-0.290496 \cdot f$ | $l_3=0.00282$ |  |  | $+2.377554/f$ |
| $L_V$ | $r_8=\infty$ | $d_5=0.07056$ | 1.72825 | 28.3 | $0.000000/f$ |
|  | $r_9=-0.812863 \cdot f$ |  |  |  | $+0.895907/f$ | wherein $L_I \ldots L_V$ are the lenses
  $r_1 \ldots r_9$ are the radii
  $d_1 \ldots d_5$ are the lens thicknesses
  $l_1 \ldots l_3$ are the air spaces
  $n_d$ are the indices of refraction
  $v$ are the Abbe numbers and
  $f$ is the focal length of the objective.

References Cited in the file of this patent

UNITED STATES PATENTS

| | | |
|---|---|---|
| 583,336 | Rudolph | May 25, 1897 |
| 759,537 | Martin | May 10, 1904 |
| 2,171,640 | Berek | Sept. 5, 1939 |
| 2,406,762 | Grey | Sept. 3, 1946 |
| 2,499,264 | Wynne | Feb. 28, 1950 |
| 2,670,659 | Tronnier | Mar. 2, 1954 |